United States Patent
Olrik et al.

(10) Patent No.: US 7,302,279 B2
(45) Date of Patent: Nov. 27, 2007

(54) MOBILE TERMINAL, A METHOD OF OPERATING THE TERMINAL, AND INFORMATION ITEMS FOR USE THEREIN

(75) Inventors: Jakob Olrik, Copenhagen (DK); Peter Dam Nielsen, Lyngby (DK)

(73) Assignee: Nokia Corporation, Espoo (FI)

( * ) Notice: Subject to any disclaimer, the term of this patent is extended or adjusted under 35 U.S.C. 154(b) by 281 days.

(21) Appl. No.: 10/321,549

(22) Filed: Dec. 18, 2002

(65) Prior Publication Data

US 2004/0204137 A1    Oct. 14, 2004

(51) Int. Cl.
*H04B 1/38* (2006.01)
*H04M 1/00* (2006.01)
*G06F 3/02* (2006.01)
*G06F 3/048* (2006.01)
*G09G 5/00* (2006.01)

(52) U.S. Cl. .................. 455/566; 345/169; 345/168; 715/810

(58) Field of Classification Search ............. 455/566, 455/550.1, 456.1, 456.2, 456.3; 341/22; 379/354; 345/473, 661, 169, 168; 715/854, 715/855, 810
See application file for complete search history.

(56) References Cited

U.S. PATENT DOCUMENTS 5,995,106 A * 11/1999 Naughton et al. .......... 715/854
6,052,070 A    4/2000 Kivela et al.
2002/0123368 A1* 9/2002 Yamadera et al. .......... 455/556

FOREIGN PATENT DOCUMENTS

DE    19706595       7/1998
EP    1004957 A1    5/2000

* cited by examiner

*Primary Examiner*—George Eng
*Assistant Examiner*—Wesley Kim
(74) *Attorney, Agent, or Firm*—Banner & Witcoff, Ltd.

(57) ABSTRACT

A mobile terminal, a method of operating the terminal and information items or GIF's for use therein. The terminal provides on its display a plurality of information items or menu items which are all selectable—one by each of a plurality of selection keys or buttons. In this manner, navigation through a menu structure is much faster. In addition, multi-purpose buttons may be used for both navigation and selection, making navigation and selection even easier and faster for a user.

16 Claims, 2 Drawing Sheets

MOBILE TERMINAL, A METHOD OF OPERATING THE TERMINAL, AND INFORMATION ITEMS FOR USE THEREIN

BACKGROUND OF THE INVENTION

1. Technical Field of the Invention

The present invention relates to a mobile terminal and a method of operating the terminal where, on the display of the terminal, multiple information items are presented and where, in fact, more than a single item is selectable at a point in time.

2. Description of the Prior Art

In standard mobile terminals such as mobile telephones, menu navigation is performed using push buttons in a manner so that the item to be selected is navigated to a predetermined position on the display, where after a "select" button is pressed in order to select the menu item. Instead of the predetermined position on the display, the selectable menu item may be highlighted in order to inform the user of which item is selectable. This brings about the disadvantage that a large number of button operations are required in order to e.g. navigate down through a list of menu items, in that each item must be presented at the selecting position.

SUMMARY OF THE INVENTION

The present invention addresses this problem, and in a first aspect, the invention relates to a mobile terminal including:

a display providing a plurality of information items of which more than one item are marked at the same time for selection, and a plurality of selecting means for selecting at least one of the marked items, wherein each of the plurality of selecting means selects a different item of the plurality of marked items provided by the display.

Thus, even though only a single information item may, in most embodiments, be selected at any point in time, any one of a plurality of information items may be selectable from the same display view—each by using a different one of the plurality of selection means.

Presently, the display is preferably an electronic display which may be controlled to provide a plurality of information items and a plurality of types of information items, such as static images, moving images, colors etc.

Preferably, the display provides, for each of the plurality of information items provided, information identifying which selecting means providing the information item. Such information may be provided using a color or mark, which informs the user of which selecting means to use, or a direction or other moving information in a moving or animated image.

Preferably, the plurality of selecting means is each formed by one or more push buttons. In a preferred embodiment hereof, a plurality of the selecting means are formed by a multi-purpose push button selecting the pertaining information items as a function of where the multi-purpose push button is pushed.

Naturally a joystick could also be used instead of one or more pushbuttons as a joystick inherently has a number of directions freely assignable such as left, right, up, down and left, right, up, down, left up, left down, right up, right down and also the possibility of in/select by pressing on the joystick.

Also, in the preferred embodiment, the terminal further comprises means for replacing a plurality of the marked information items with a plurality of other information items that are thus marked for selection. This may be the navigation in a menu or list, such as when scrolling or changing menu.

In the preferred embodiment, the replacing means and at least two of the selecting means are provided in a single multi-purpose button in order for the user to be able to both navigate and select using the same button. This makes navigation and selection much faster and easier.

Preferably, the replacing means replace a number of information items corresponding to the number of the selecting means.

Normally, the information items describe desired operations which the user wishes to perform, such as navigation into sub menus, making a telephone call to a person identified by the information item, retrieving information identified by the information item, or the like. Thus, preferably, the terminal further comprises means for performing an action identified by the information item selected.

In a second aspect, the invention relates to a method of operating the above terminal, the method comprising:

providing, on the display, a plurality of information items and, for each information item provided, information relating to which selecting means selects that information item, and selecting, using one of the selecting means, a provided information item.

Preferably, the method further comprises the step of, subsequent to the selecting step, performing an action identified by the information item selected.

In order to e.g. navigate, the method preferably further comprises the step of, before the selecting step, replacing a plurality of the information items provided with a plurality of other information items, and providing for each of the plurality of other information items, information relating to which selecting means selects that information item.

Preferably, the number of replaced information items corresponds to the number of selecting means.

A third aspect of the invention relates to an information item for use in the above terminal or the above method, the information item comprising:

information identifying an action to be performed when the information item is selected, and information identifying which of a plurality of selecting means selects the information item.

This information identifying the selecting means could comprise:

a color also present on or at the selecting means, a pattern also present on or at the selecting means, and/or an animated image identifying the selecting means, where the animated image may have a component having a direction of movement identifying the selecting means.

DESCRIPTION OF THE ACCOMPANYING DRAWINGS

In the following, a preferred embodiment of the invention is described as an improvement of a mobile telephone and with reference to the drawings wherein.

DETAILED DESCRIPTION OF EMBODIMENTS OF THE PRESENT INVENTION

Figure 1:
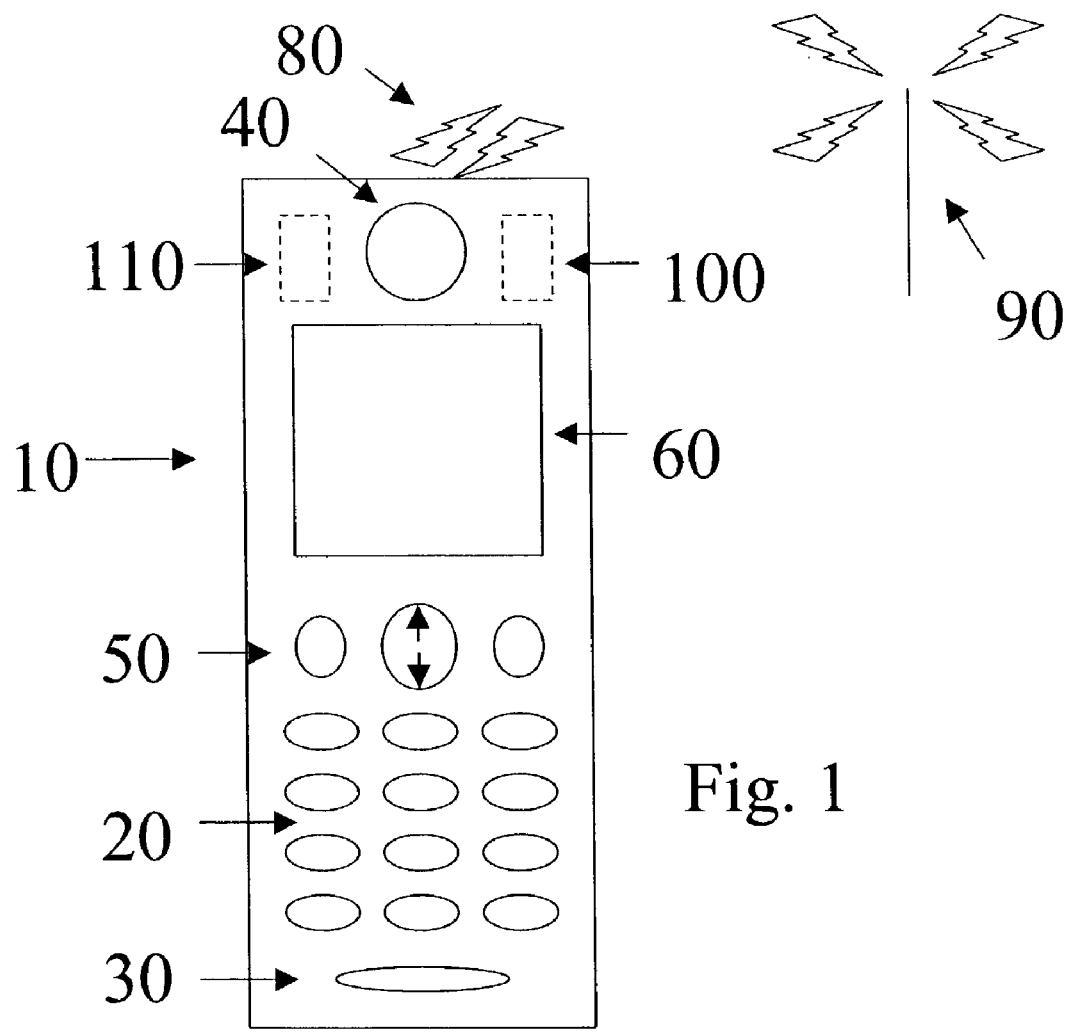
FIG. 1 illustrates in particular the user interface of the mobile telephone.

In FIG. 1, the mobile telephone 10 has, as is normal for mobile telephones, a keyboard 20, a microphone 30, a speaker 40, navigation/instruction keys 50, and a display 60 (which display may be any type of display, such as a LED display, a plasma monitor, a CRT monitor or a LCD, active or inactive matrices).

The mobile telephone 10 communicates 80 via a station 90 with the normal services, other telephones etc.

Presently, mobile telephones 10 are able to run a number of applications apart from that relating to the telephone calls.

Such applications are the maintaining of calendar functions, To-Do-lists, and/or contact information, information on available resources (servers available, GSM coverage, connectivity, internet, etc).

Also, the mobile telephones may be used as a stopwatch, a thermometer, a camera, a sound recorder, and/or a shock recorder.

Furthermore, the telephones generate or receive images, videos, audio, and/or other information, such as the time.

These applications are run on a processor (such as a standard processor, a RISC processor, a SPARC processor, a DSP, CISC, or a software programmable processor) indicated by 100 in the telephone 10 and each application may store and retrieve information in or from a storage (such as a RAM, a ROM, a PROM, a EPROM, a EEPROM, a disc, an optical disc, an optical memory, or a tape memory) indicated by 110 in the telephone 10.

The applications stored in the memory 110 can be of various kinds one of them being user interface applications which determines which commands should be executed corresponding to key presses entered via the keypad 20, navigation keys and soft keys 50.

In mobile terminals, the menu structure is normally a linear list where selections of menu items may produce another linear list—a sub menu.

Navigation in the list is typically performed by up and down arrows whereby the desired menu item is brought to a predetermined selection position on the display, where after a select key is pressed in order to select the desired menu item.

Thus, moving 5 items down in a menu and selecting an item requires 6 button operations in normal telephones.

The present telephone has multiple select buttons. In the navigation keys 50 of FIG. 1, the center button may be a combined up/down navigation button and the two extreme buttons may be used for each selecting one of two selectable items provided on the display.

Selection between two selectable items on the display or menu, navigation in the menu needs a step to select each single item. Thus, the navigation in the prior art menu is now performed in steps of two items, when two items may be selected.

Figure 2:
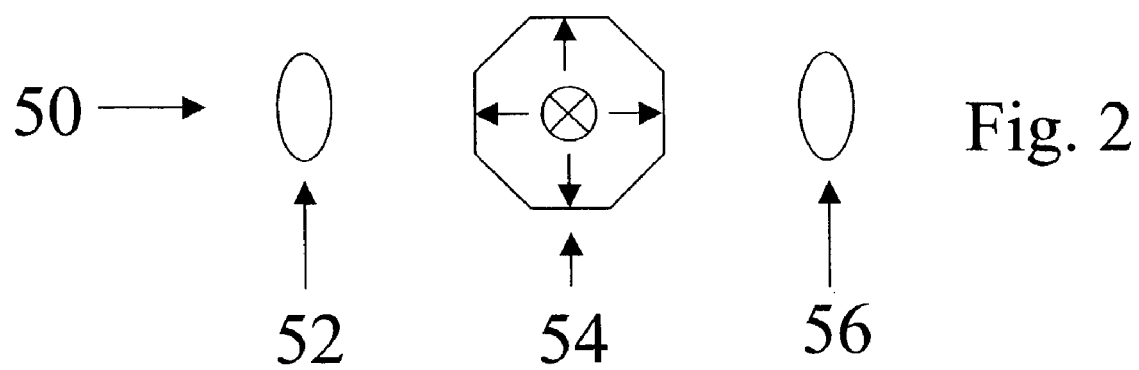
FIG. 2 illustrates another embodiment of navigating buttons on a mobile telephone.

In FIG. 2, another set of navigation keys are illustrated. Now the center button 54 is a five-way button, which senses force at its upper, lower, right, and left sides as well as its center. Thus, the button 54 itself may be used for navigating up and down in the menu as well as selecting between three selectable items in the menu.

Naturally, the other buttons, 52 and 56 may also be used for selecting even further items provided on the display at the same time.

Figure 3:
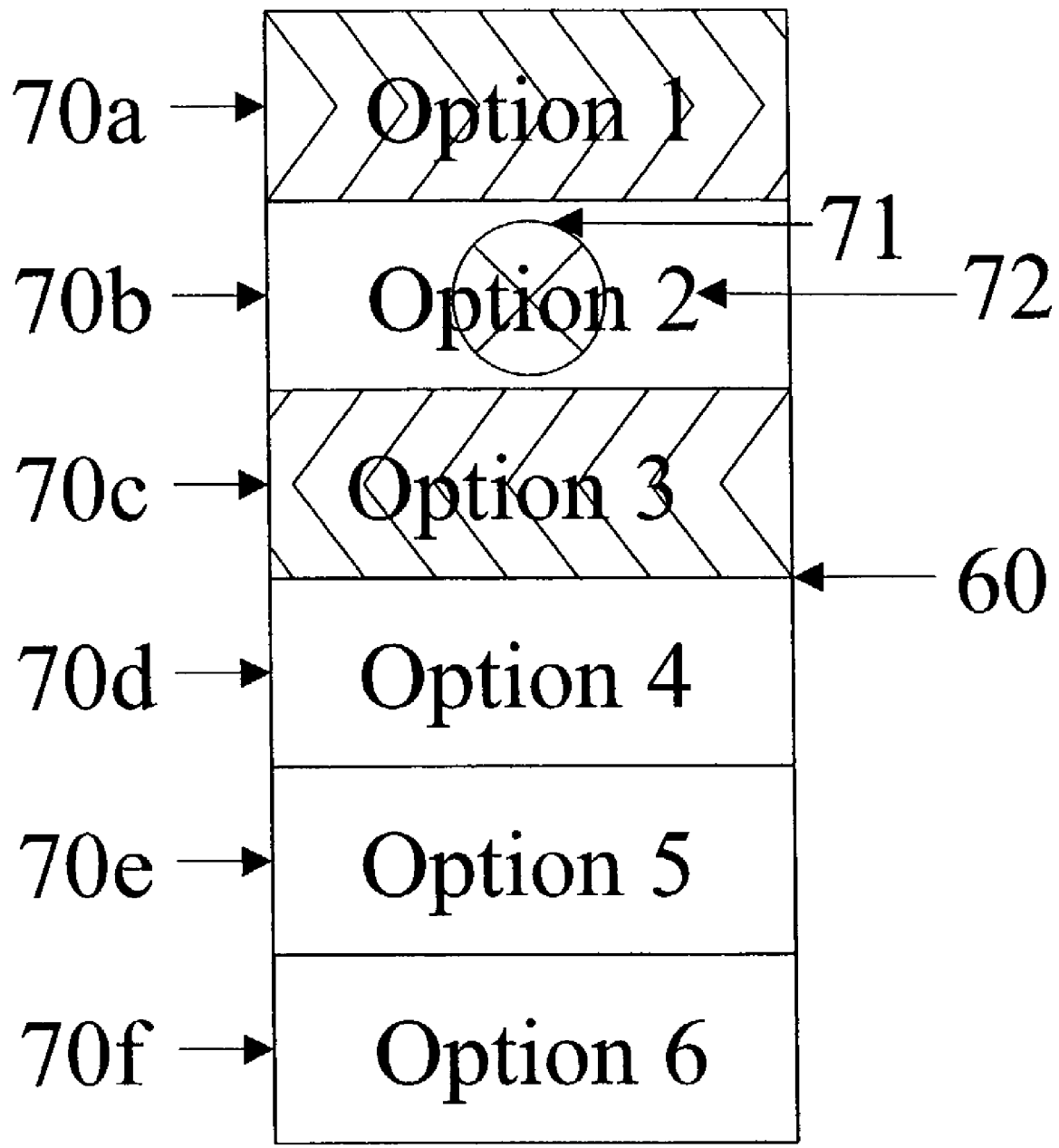
FIG. 3 illustrates three information items provided on a display.

FIG. 3 illustrates a display 60 with three six selectable items, Option 1, Option 2, Option 3, Option 4, Option 5 and Option 36 (70a-f) which items are normally formed by images such as GIFs or bitmaps. Of these the options Option 1, Option 2 and Option 3 (70a-c) are marked for selection.

The second item 70b, option 2 has the text "Option 1" 72, which text denotes which action will be undertaken if that item is selected, and an underlying pattern 71 indicating that the middle of push button 54 should be pressed to select this item. This pattern may be an illustration that may be found at the center of the button 54. This pattern 71 may be fixed or may alter, such as between a lower size and a larger size and back in a way that clearly indicates to the user which selecting means is to be used to select this item and thereby executing the action as denoted by the item 72 which could be a text item or an image item such as a GIF or bitmap.

The top item 70a has the text "Option 1", which text denotes which action will be undertaken if that item is selected, and an underlying pattern which moves in the direction of the "arrows": to the right in order to illustrate to the user that selection of this item is obtained by pressing the right side of the button 54.

The situation for the third item, option 3 (70c) is analogous meaning that it has an underlying pattern in the form of arrows pointing to the left indicating that the left side of and the left side of the single multiple purpose button 54 should be pressed to select this item.

Alternatively, the different buttons and items may have other colors or other markings, which then would be reflected in the underlying patterns 71. They could also have different markings from each other as long as it is clear to a user which underlying pattern indicates which selecting means.

The three last options Option 4, 5 and 6 (70d-f) are not marked for selection, which is indicated by them not having any underlying image indicating a select button.

Below, examples are given of how fast navigation may be using the present invention: Example A: four navigation keys: the navigation keys of FIG. 1 or a key 54 without the center pressure possibility.

The full menu/list is:
option 1
option 2
option 3
option 4
option 5
option 6

The first display is:
>option 1> choose with right key
<option 2< choose with left key
option 3
option 4
option 5
option 6

A navigation down key gives, on the display:
option 1
option 2
>option 3> choose with right key
<option 4< choose with left key
option 5
option 6

That is, replacing the marked options 1 and 2 with the other options 3 and 4, which are now marked. Thus, selecting option 4 requires only one navigation key press (for scrolling) and one selection key presses. Normally, this would require three navigations key presses (for scrolling) and a selection key press.

Example B: five navigation keys: a key 54 as illustrated in FIG. 2.

Again, the full menu/list is:
option 1
option 2
option 3
option 4
option 5
option 6

The first display is:
>option 1> choose with right key
—option 2— choose with middle key
<option 3< choose with left key
option 4
option 5
option 6

A navigation down key gives:
option 1
option 2
option 3
>option 4> choose with right key
—option 5— choose with middle key
<option 6< choose with left key That is, replacing the marked options 1, 2 and 3 with the other options 4, 5 and 6 which are now marked. Thus, selecting option 6 requires a single navigation key press and a selection key press, where in normal telephones it would require 5 navigation key presses and the selection key press.

In fact, in addition to the lower number of navigation operations, the use of a multi-purpose button as the button 54 also provides the advantage that the user does not have to move his/hers finger so much as it is already situated over the navigation key(s) and the selection keys.

It could also be envisioned to use a multi-way navigation key, joystick, rotator, wheel or other arrangement of keys to have nine directions (left, right, up, down, left up, left down, right up, right down and in/select) for either marking 7 items at once in a top-down list or for scrolling through a matrix structure using for instance left, right, up and down for scrolling i.e. replacing and left up, left down, right up, right down and in/select for selecting marked items. The middle direction (in/select) being, of course, optional. This could of course easily be implemented with a joystick or multidirectional navigation key.

The present embodiment has been described as a mobile telephone. However, it is clear that the same functionality is advantageous on other stationary or handheld, mobile or stationary devices, such as hand held electronic calendars or computers.

The invention has been described with reference to the above described embodiments. However, as is readily appreciated by a person skilled in the art, other embodiments than the ones disclosed above are equally possible within the scope of the invention, as defined by the appended patent claims.

The invention claimed is:

1. A mobile terminal, comprising:
    a display;
    a multiple purpose selector having a plurality of purposes;
    a processor for controlling the mobile terminal;
    a storage, the storage including computer executable code
        for causing the processor to perform the steps of:
        (a) providing a list with a plurality of items on the display, the list including more items on the display than the multiple purpose selector includes purposes;
        (b) indicating a first set of items of the list being displayed, wherein each item in the first set is selectable by selecting one of the plurality of purposes of the multiple purpose selector; and
        (c) in response to an input, indicating a second set of items of the list being displayed, wherein each item in the second set is selectable by selecting one of the plurality of purposes of multiple purpose selector, and wherein the first set and the second set do not overlap, wherein an indication is provided approximate each item in the sets, the indication indicating which purpose of the multiple purpose selector will select that item.

2. The mobile terminal of claim 1, wherein the multiple purpose selector is a 5-way navigation button.

3. The mobile terminal of claim 1, wherein at least one of the purposes of the multiple purpose selector is configured to be used as the input to cause the second set of items to be indicated.

4. The mobile terminal of claim 1, wherein the indication is an animated graphic.

5. The mobile terminal of claim 4, wherein the animated graphic is moving in a direction associated with the purpose that will select the item.

6. The mobile terminal of claim 1, wherein each indication is color coded to correspond to a symbol having a similar color that is associated with one of the purposes of the multiple purpose selector.

7. A method of performing a command on a mobile terminal;
    comprising:
        (a) providing a list of items on a display, a portion of the list being displayed including more items than a plurality of purposes associated with a multiple purpose selector;
        (b) providing a plurality of indications on the display associated with a first set of items in the displayed portion of the list, each of the plurality of indications associated with one of the plurality of purposes of the multiple purpose selector;
        (c) associating the plurality of indications with a second set of items on the displayed portion of the list in response to an input, wherein the first set and the second set do not overlap;
        (d) receiving a selection of one of the purposes associated with one of the indications and one of the items in the list; and
        (e) performing an operation according to a command associated with the item selected.

8. The method of claim 7, wherein the providing of indications in (b) comprises:
    (i) providing a plurality of images on the display, each of the plurality of images positioned adjacent one of the items in the first set.

9. The method of claim 8, wherein the associating of the indications with the second set in (c) comprises:
    (i) associating each of the plurality of images with an item in the second set.

10. The method of claim 8, wherein the images are animated.

11. The method of claim 10, wherein each animation moves in a direction associated with an action required by the user to make the selection of the associated purposes.

12. The method of claim 7, wherein the input in (c) is received from a selection of a purpose of the multiple purpose selector.

13. The method of claim 12, wherein the multiple purpose selector includes two purposes configured to associate the plurality of indications with a different set of items in the list, wherein the associating in response to input in (c) comprises:
   (i) receiving a selection of one of the two purposes; and
   (ii) causing the plurality of indications to be associated with the set of items corresponding to the selection of the purpose.

14. The method of claim 7, wherein the indications represent figures displayed on the multiple purpose selector.

15. A method, comprising:
   providing a list of items on a display, the number of items being displayed being greater than a plurality of purposes associated with a multi-purpose selector;
   providing a plurality of indications on the display corresponding to the plurality of purposes, the plurality of indications being associated with a first set of items chosen from the list of items being displayed;
   associating the plurality of indications with a second set of items chosen from the list of items being displayed, wherein the first set and the second set do not overlap;
   receiving an input from a first purpose of the multi-purpose selector, the purpose corresponding to a first indication of the plurality of indications; and
   in response to the input, performing a command associated with a first item of the second set of items, the first item associated with the first indication.

16. The method of claim 15, wherein the plurality of indications are graphics that resemble markings on the corresponding purposes of the multi-purpose selector.

* * * * *